N. B. RANDAL.
FISH HOOK.
APPLICATION FILED JUNE 27, 1910.

991,745.

Patented May 9, 1911.

WITNESSES:
Emma D. Merchant
L. E. Noack.

INVENTOR
N. B. Randal
BY
Schley & Davis
ATTORNEYS.

UNITED STATES PATENT OFFICE.

NAPOLEON B. RANDAL, OF WALNUT SPRINGS, TEXAS.

FISH-HOOK.

991,745.   Specification of Letters Patent.   Patented May 9, 1911.

Application filed June 27, 1910. Serial No. 569,150.

*To all whom it may concern:*

Be it known that I, NAPOLEON B. RANDAL, citizen of the United States, residing at Walnut Springs, in the county of Bosque and State of Texas, have invented certain new and useful Improvements in Fish-Hooks, of which the following is a specification.

My invention relates to new and useful improvements in fish hooks and more particularly to fish hooks designed to carry live bait.

The object of my invention is to provide a fish hook having a bait holder which will not mutilate or kill live bait placed thereon and one which will allow the bait to be raised or lowered with relation to the barb of the hook.

Another object of my invention is to provide a fish hook having a bait holder which will hold live bait in such a manner that it will not become detached in the water and one which will enable the angler to quickly remove his bait without danger of injuring his hands by coming in contact with the barb.

Finally the object of the invention is to provide means of the character described that will be strong, durable, efficient, and easy of operation, simple and comparatively inexpensive to construct, and also in which the several parts will not be likely to get out of working order.

Figure 1:
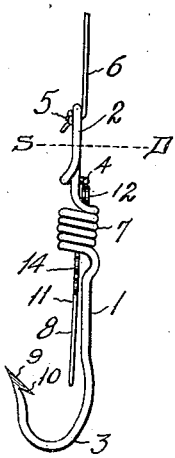
Figure 2:
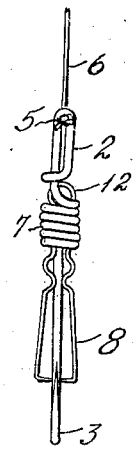
Figure 3:
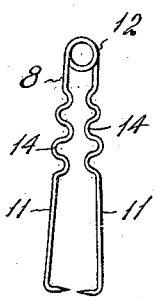
Figure 4:

With the above and other objects in view, the invention has relation to certain novel features of construction and operation, an example of which is described in this specification and illustrated in the accompanying drawings, wherein:

Figure 1. is a side elevation of my device. Fig. 2. is a front elevation of the same showing the bait holder in position. Fig. 3. is an enlarged front elevation of the bait holder removed from the hook. Fig. 4. is a vertical section of my hook showing the bait holder horizontal within the coils of the hook, and Fig. 5. is a section taken on the line S—D of Fig. 1.

Figure 5:

In the drawings the numeral 1 designates a shank made of the usual material and terminating in an elongated loop at one end and into a curved hook 3 at the other end. The loop 2 is formed by bending the shank so that a portion of the same will extend down parallel therewith for a short distance and then by bending the end 4 around the shank as is shown in Fig. 5.

The specific construction of the elongated loops 2 will enable the angler to place his hook on a line without necessitating the tedious operation of passing the end of the line through the loop. After tying a knot 5 in the end of a line 6 the line may be passed under the end 4 of the loop and brought around the shank 1 and upward until the knot 5 engages with the shank 1 and the line 6 is wedged securely between the shank 1 and the depending side of the loop. Below the end 4 the shank 1 is bent to form a coil 7 in which a bait holder 8 is loosely mounted. After forming the coil the shank 1 extends downward and terminates in the curved hook 3 which is provided at its end with a pointed bill 9 and the usual barb 10.

The bait holder 8 consists of two depending arms 11 connected at the top by a loop 12 which forms a spring hinge. The lower ends of the arms 11 are bent inward and are pointed so as to be easily pressed into the bait. The loop 12 being of larger diameter than the coil 7 formed in the shank 1 will hold the bait at a point in vertical alinement with the bill of the hook. And should it be desired to raise the bait with relation to the bill of the hook it is only necessary to slide the bait holder upward through the coil 7 to the desired height where it will be held by contours 14 in the arms 11 which engage with the side of the coil 7. The bait holder 8 being made of resilient material will enable the angler to spread apart the ends which engage with the bait so that baits of different sizes may be placed therein and the resilient nature of the arms 11 will cause them to engage sufficiently with the bait to hold it securely in position.

It will be noted that the arms 11 and their inwardly extending ends are of much smaller diameter than the shank of the hook or its bill. The size of the arms 11 and their point has been reduced to reduce the size of the puncture made in the bait. It has been demonstrated that a minnow placed over the barb of an ordinary hook lives but a short time and then dies from the loss of blood and must be replaced. Live bait placed on a hook of the usual construction soon loses its attractive qualities and is usually so badly torn that a fish may devour the same without coming in contact with the hook or moving the line enough to signal the angler.

What I claim is:

1. In a fish hook the combination with a shank having the usual bill and barb, of a coil arranged in the shank intermediate its ends, and a bait holder having depending arms provided with convolutions adapted to engage with the coil.

2. In a fish hook the combination with a shank having an elongated loop arranged on one end of a coil formed in the shank below the loop, and a bait holder having depending arms hinged at their top provided with inturned ends for securing bait and having convolutions in the arm adapted to engage with the coil.

3. In a fish hook the combination with a shank provided with an elongated loop having one end open to engage over a line, of a coil arranged below the loop, and a bait holder having depending arms hingedly connected and provided with convolutions arranged in the arms to engage with the coil to support the bait holder and points arranged on the arms adapted to support a bait.

4. In a fish hook the combination with a shank, of an elongated loop arranged on the shank, a coil formed by the shank intermediate its ends, and a bait holder having depending arms and inturned ends arranged to be supported by the coil.

In testimony whereof I have signed my name to this specification in the presence of two subscribing witnesses.

NAPOLEON B. RANDAL.

Witnesses:
 W. S. PEDIGO,
 A. H. CADDEL.

Copies of this patent may be obtained for five cents each, by addressing the "Commissioner of Patents, Washington, D. C."